US012776014B2

(12) United States Patent
Raj et al.

(10) Patent No.: US 12,776,014 B2
(45) Date of Patent: Oct. 27, 2026

(54) METHODS AND SYSTEMS FOR HYPERSPECTRAL IMAGE CORRECTION

(71) Applicants: Rahul Raj, Patna (IN); Karthik Kumar Billa, Hyderabad (IN)

(72) Inventors: Rahul Raj, Patna (IN); Karthik Kumar Billa, Hyderabad (IN)

( * ) Notice: Subject to any disclaimer, the term of this patent is extended or adjusted under 35 U.S.C. 154(b) by 361 days.

(21) Appl. No.: 17/888,480

(22) Filed: Aug. 16, 2022

(65) Prior Publication Data

US 2023/0078777 A1 Mar. 16, 2023

Related U.S. Application Data

(60) Provisional application No. 63/241,096, filed on Sep. 7, 2021.

(51) Int. Cl.
*G06T 5/94* (2024.01)
*G06T 5/80* (2024.01)

(52) U.S. Cl.
CPC ...... *G06T 5/80* (2024.01); *G06T 2207/10036* (2013.01)

(58) Field of Classification Search
CPC ............. G06T 5/80; G06T 2207/10036; G06T 2207/10032; Y02A 90/10; G06V 20/13
See application file for complete search history.

(56) References Cited

U.S. PATENT DOCUMENTS

| | | | | |
|---|---|---|---|---|
| 7,337,065 | B2 * | 2/2008 | Adler-Golden | G06V 20/13 702/3 |
| 2009/0274387 | A1 * | 11/2009 | Jin | H04N 23/611 348/E5.037 |
| 2019/0130547 | A1 * | 5/2019 | Pacifici | G06T 7/514 |

FOREIGN PATENT DOCUMENTS

| | | | | |
|---|---|---|---|---|
| CA | 2836210 C * | 6/2021 | | G01N 21/274 |
| WO | WO-2021038621 A1 * | 3/2021 | | |

* cited by examiner

*Primary Examiner* — John Villecco
*Assistant Examiner* — Kyla Guan-Ping Tiao Allen

(57) ABSTRACT

In one aspect, a method of hyperspectral image correction includes the step of generating one or more lookup tables with a radiative transfer model for converting an at-sensor digital number image from a hyperspectral satellite to a bottom of atmosphere radiance and reflectance value image. The intermediate method includes conversion of at-sensor image DN values to TOA radiance and then to TOA reflectance. Later, the method include creating a pre-classification layer using the TOA reflectance image to mask the TOA radiance image. Further, the method includes performing aerosol correction on the masked at-sensors radiance image by applying a pixel-wise albedo estimation using the one or more lookup tables to generate an aerosol corrected radiance image. The method includes performing a water vapor correction on the aerosol corrected radiance image to generate a BOA radiance image. At last, the method includes converting the BOA radiance image to a BOA reflectance.

1 Claim, 13 Drawing Sheets

100

100

400

800

900

1100

METHODS AND SYSTEMS FOR HYPERSPECTRAL IMAGE CORRECTION

CLAIM OF PRIORITY

This application claims priority to U.S. Provisional Patent Application No. 63/241,096, filed on 7-Sep.-2021, and titled METHODS AND SYSTEMS FOR HYPERSPECTRAL IMAGE CORRECTION. This provisional patent application is hereby incorporated by reference in its entirety.

SUMMARY OF THE INVENTION

In one aspect, a method of hyperspectral image correction includes the step of generating one or more lookup tables with a radiative transfer model for converting an at-sensor digital number image from a hyperspectral satellite to a bottom of atmosphere radiance and reflectance value image. The intermediate method includes conversion of at-sensor image DN values to top-of-atmosphere (TOA) radiance and then to TOA reflectance. Later, the methods include creating a pre-classification layer using the TOA reflectance image to mask the TOA (at-sensor) radiance image. Further, the method includes performing aerosol correction on the masked at-sensors radiance image by applying a pixel-wise albedo estimation using the one or more lookup tables to generate an aerosol corrected radiance image. The method includes performing a water vapor correction on the aerosol corrected radiance image to generate a bottom—of-atmosphere (BOA) radiance image. At last, the method includes converting the BOA radiance image to a BOA reflectance.

BACKGROUND

The optical data being recorded at earth-orbiting hyperspectral satellite sensors, can be affected by various atmospheric layers/particles. These atmospheric layers or particles may be, inter alia, the ozone layer, aerosol particles, water vapor, and other gaseous molecules present in the atmosphere. To identify the feature or object present on the earth's surface and to do critical analysis like crop or soil chemical content estimation, it is important to remove the atmospheric effects from the collected data.

FIG. 1 (background) illustrates an example path of light from sun to sensor 100, according to some embodiments. As shown, the incoming and outgoing sunlight in the earth's atmosphere experiences various absorption and scattering phenomena. This may occur due to the change in density of the atmosphere, and various gaseous and water molecules in the atmosphere. The ground reflected sunlight recorded at satellite sensors consists of noise due to its interaction with the atmosphere. This noise needs to be removed from the recorded data. Accordingly, improvements to the conversion of DN numbers to ground leaving radiance/reflectance are desired to further improve hyperspectral image correction methods.

BRIEF DESCRIPTION OF THE DRAWINGS

The present application can be best understood by reference to the following description taken in conjunction with the accompanying figures, in which like parts may be referred to by like numerals.

Figure 8:
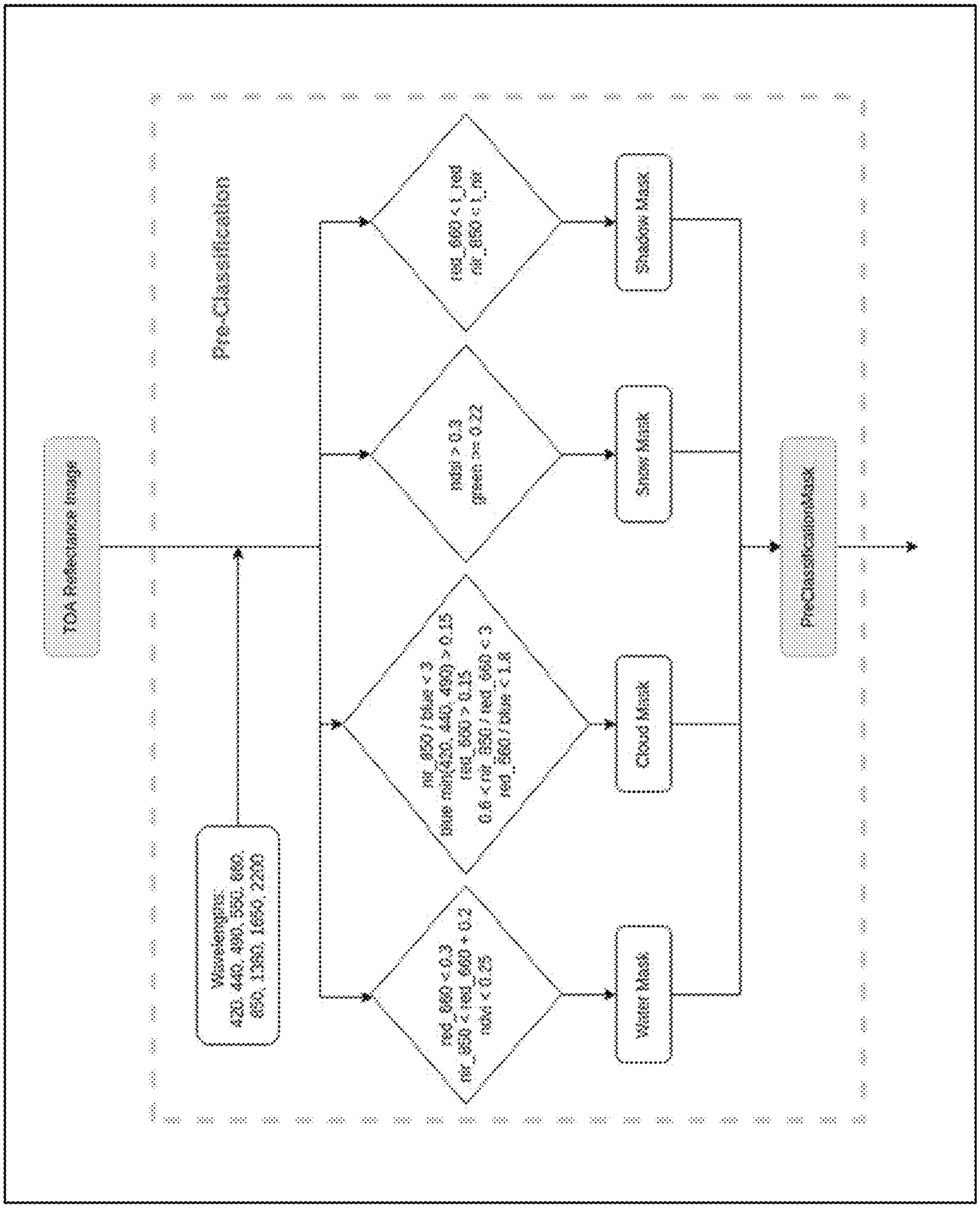

Thresholds applied on different bands are shown in FIG. 8, according to some embodiments.

Figure 9:
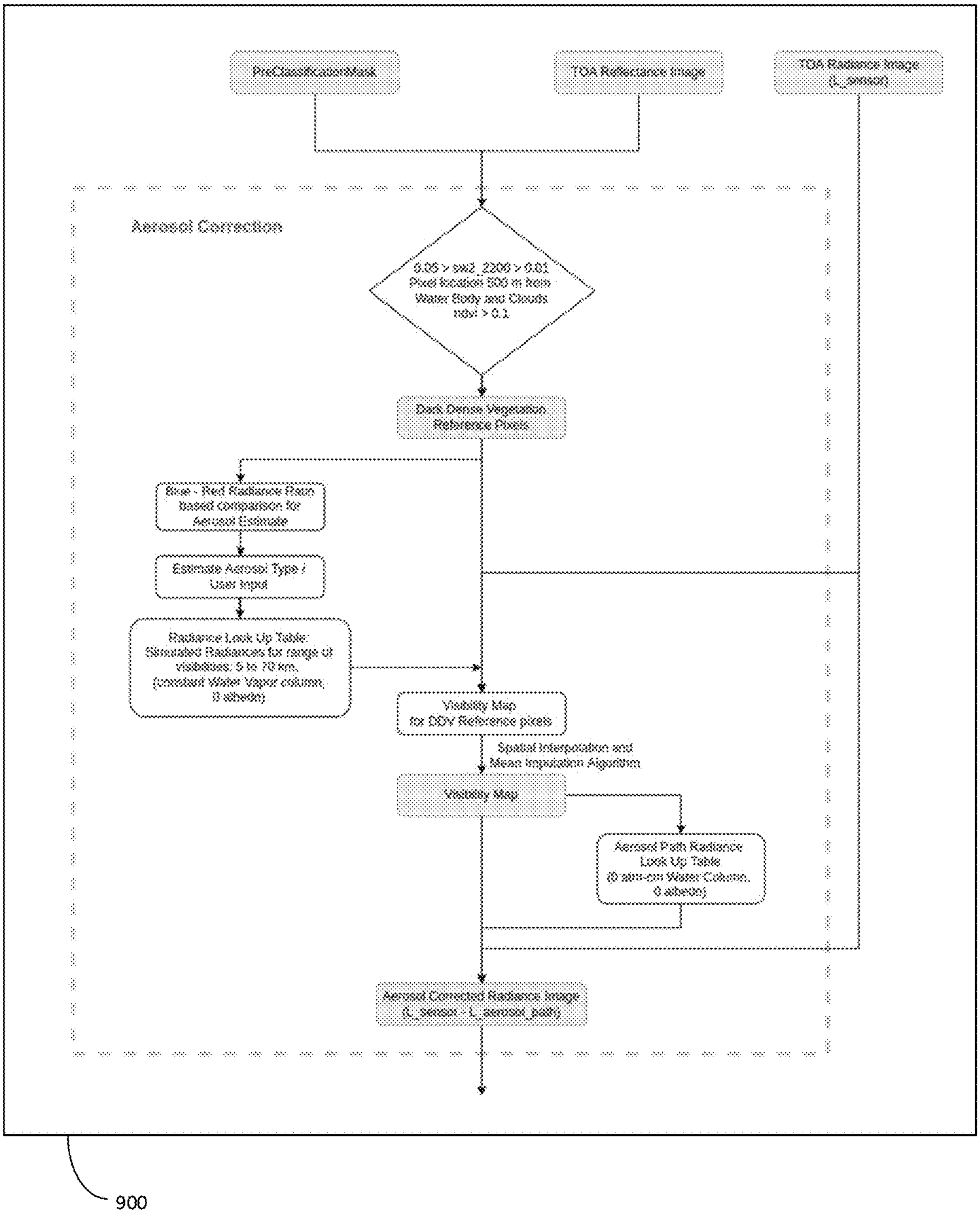

FIG. 9 illustrates an example Aerosol correction flowchart, according to some embodiments.

Figure 10:
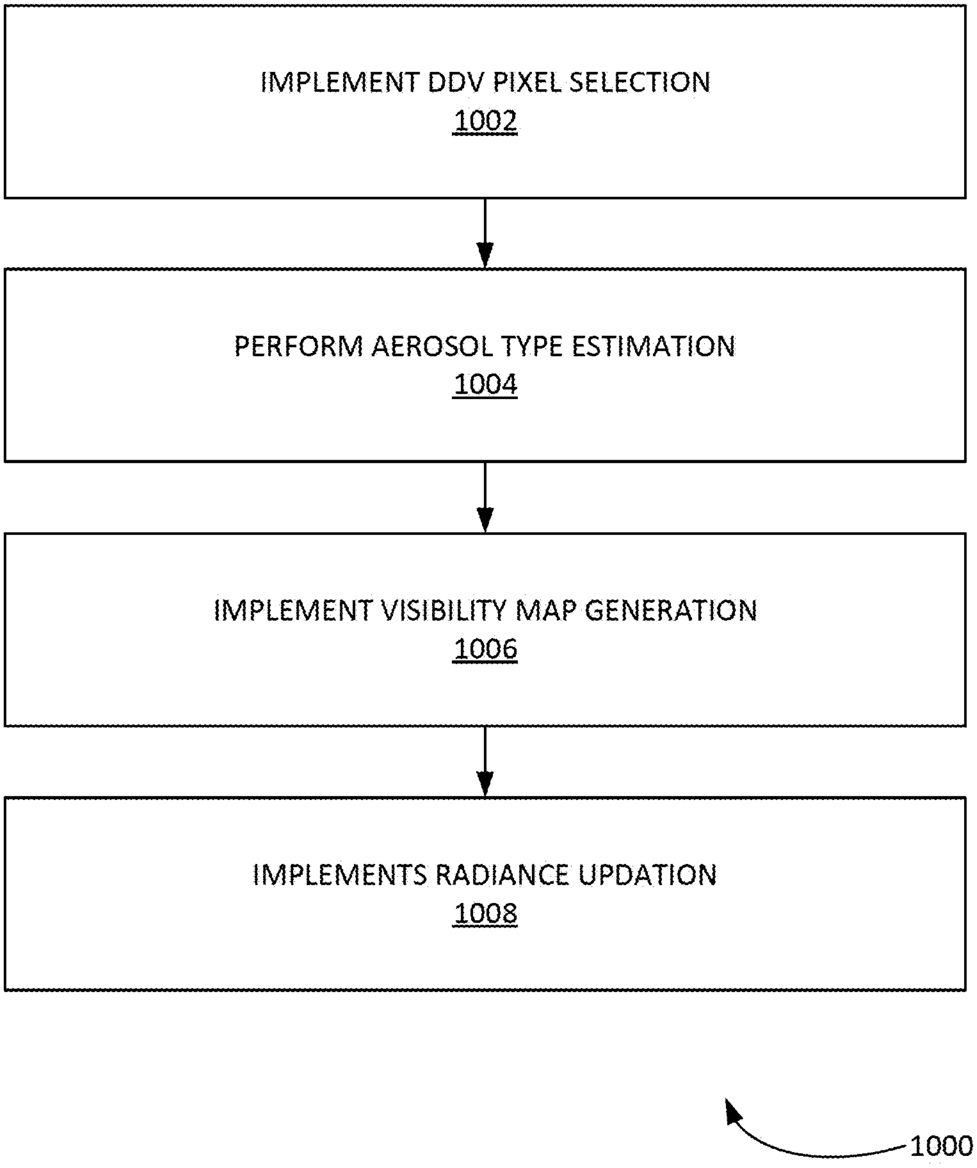

FIG. 10 illustrates an example process for aerosol correction, according to some embodiments.

Figure 11:
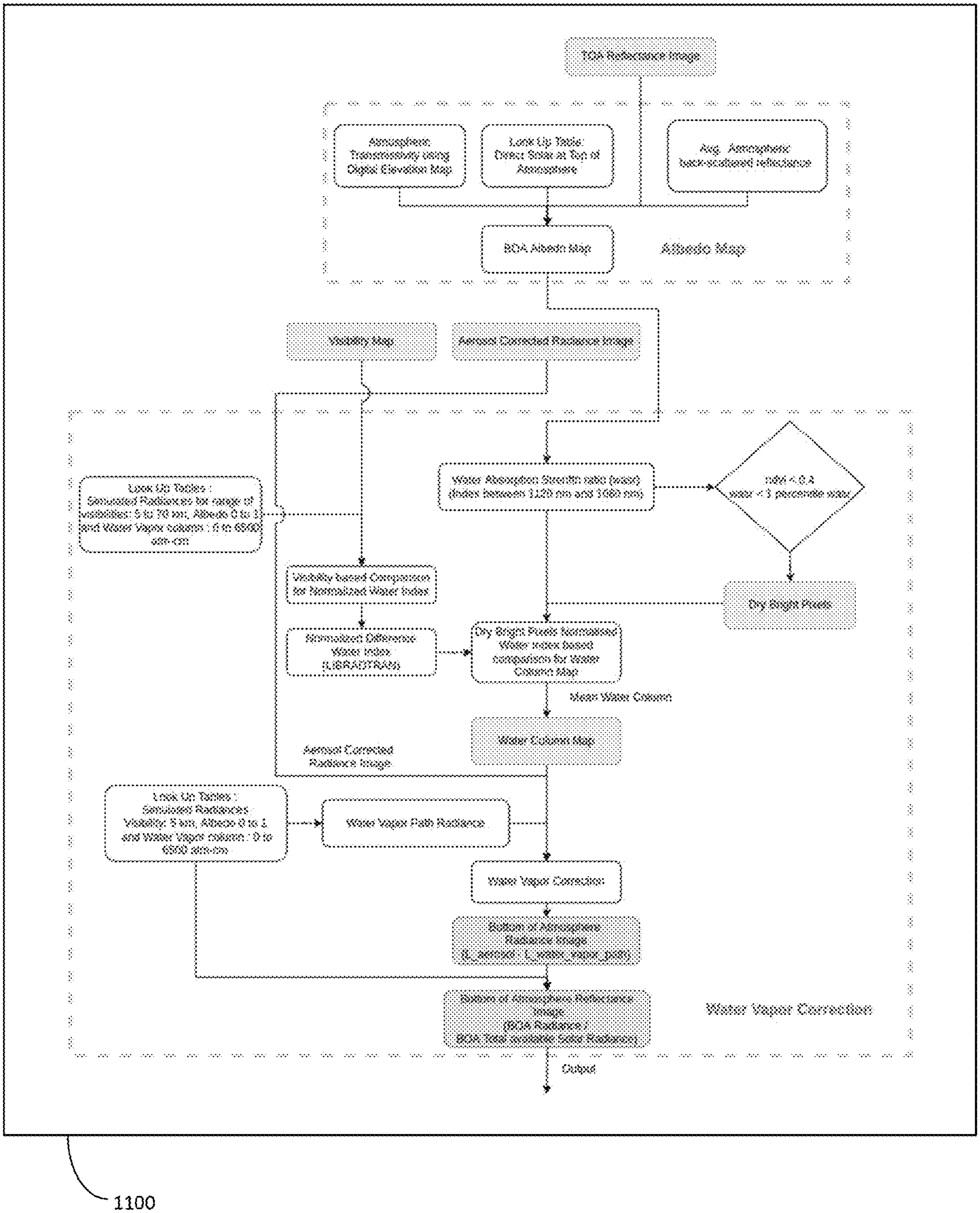

FIG. 11 shows the flowchart of an atmospheric water vapor correction algorithm, according to some embodiments.

Figure 12:
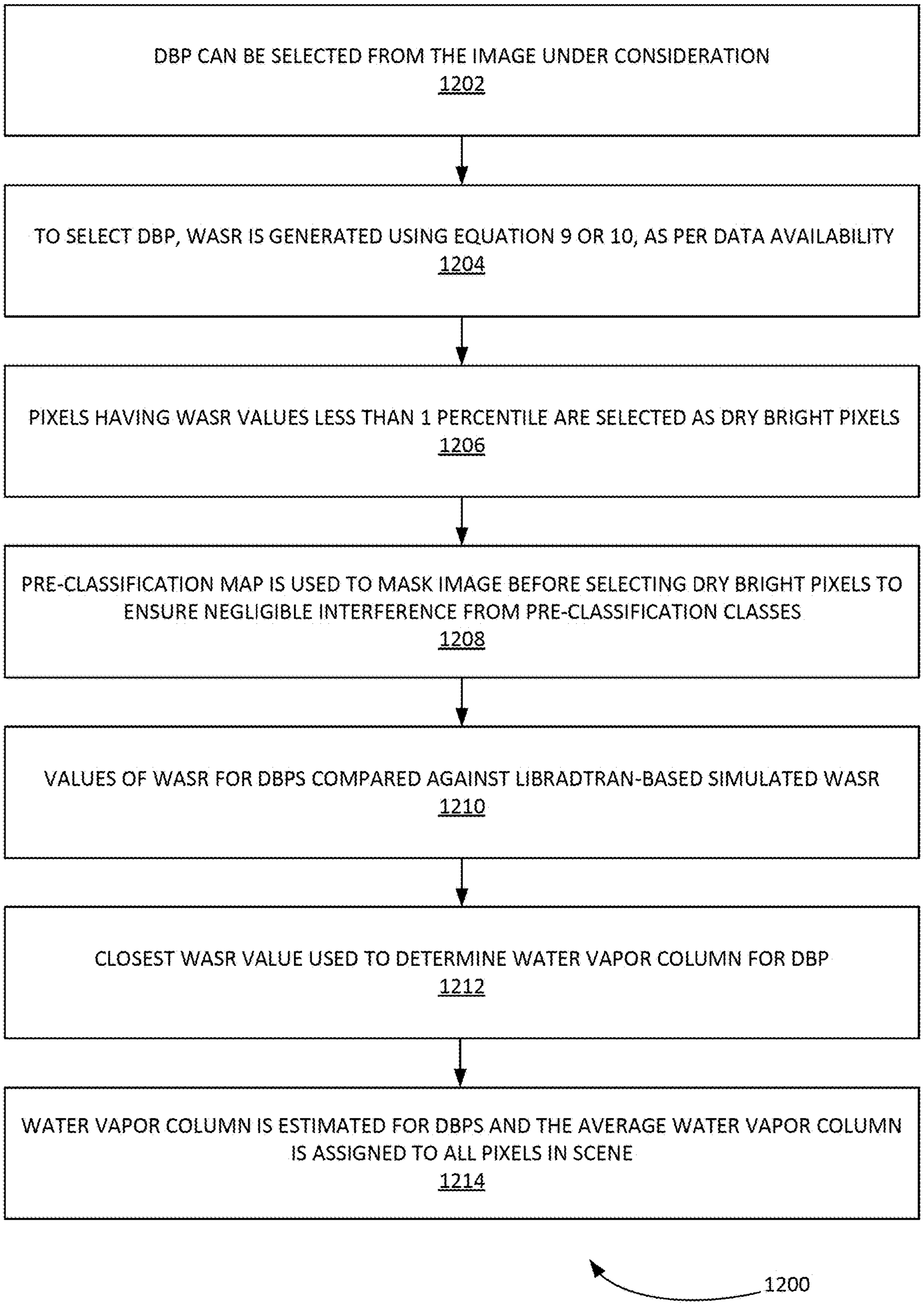

FIG. 12 illustrates an example process for implementing water vapor correction, according to some embodiments.

Figure 13:
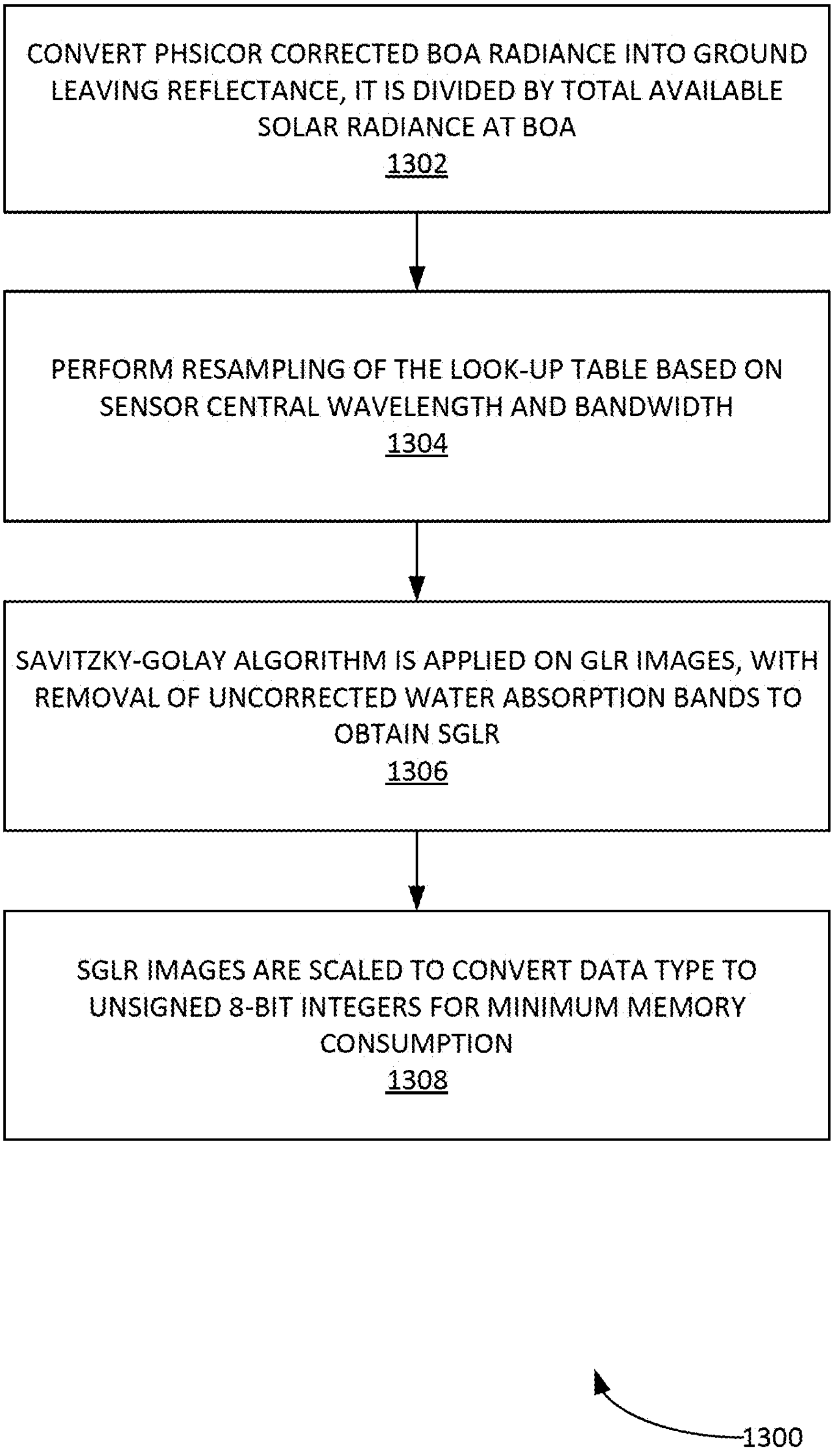

FIG. 13 illustrates an example process for converting a bottom of atmosphere radiance image to ground leaving reflectance, according to some embodiments.

The Figures described above are a representative set and are not an exhaustive with respect to embodying the invention.

DESCRIPTION

Disclosed are a system, method, and article of manufacture for hyperspectral image correction. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Dark Dense Vegetation (DDV) can be a pixel content for a pixel including DDV.

Digital elevation model (DEM) is a 3D computer graphics representation of elevation data to represent terrain.

Digital number (DN) can be the discrete of an analog value sampled by an analog-to-digital converter.

GeoTIFF is a public domain metadata standard which allows georeferencing information to be embedded within a TIFF file. Example additional information includes, inter alia: map projection, coordinate systems, ellipsoids, datums, and other information used to establish the exact spatial reference for the file.

Hierarchical Data Format (HDF) is a set of file formats (e.g. HDF4, HDF5) designed to store and organize large amounts of data.

Hyperspectral imaging can be used to collect and process information from across the electromagnetic spectrum. Hyperspectral imaging can be used, inter alia, to obtain the spectrum for each pixel in the image of a scene, with the purpose of finding objects, identifying materials and their chemical properties, and/or detecting processes.

Hyperion Enterprise is a database that contains data that can be used to develop and print reports.

libRadtran (library for radiative transfer) is a collection of functions and programs for calculation of solar and thermal radiation in the Earth's atmosphere.

Lookup table (LUT) is an array that replaces runtime computation with a simpler array indexing operation.

Normalized difference vegetation index (NDVI) is a simple graphical indicator that can be used to analyze remote sensing measurements, often from a space platform, assessing whether or not the target being observed contains live green vegetation.

Example Systems and Methods

Methods provided herein can be used for atmospheric correction of hyperspectral data. For example, methods can be used in the conversion process of DN numbers to the ground leaving radiance in the range of 400-2500 nm of the electromagnetic spectrum (EM). Two major atmospheric constituents discussed herein are aerosol and water vapor.

Figure 1:
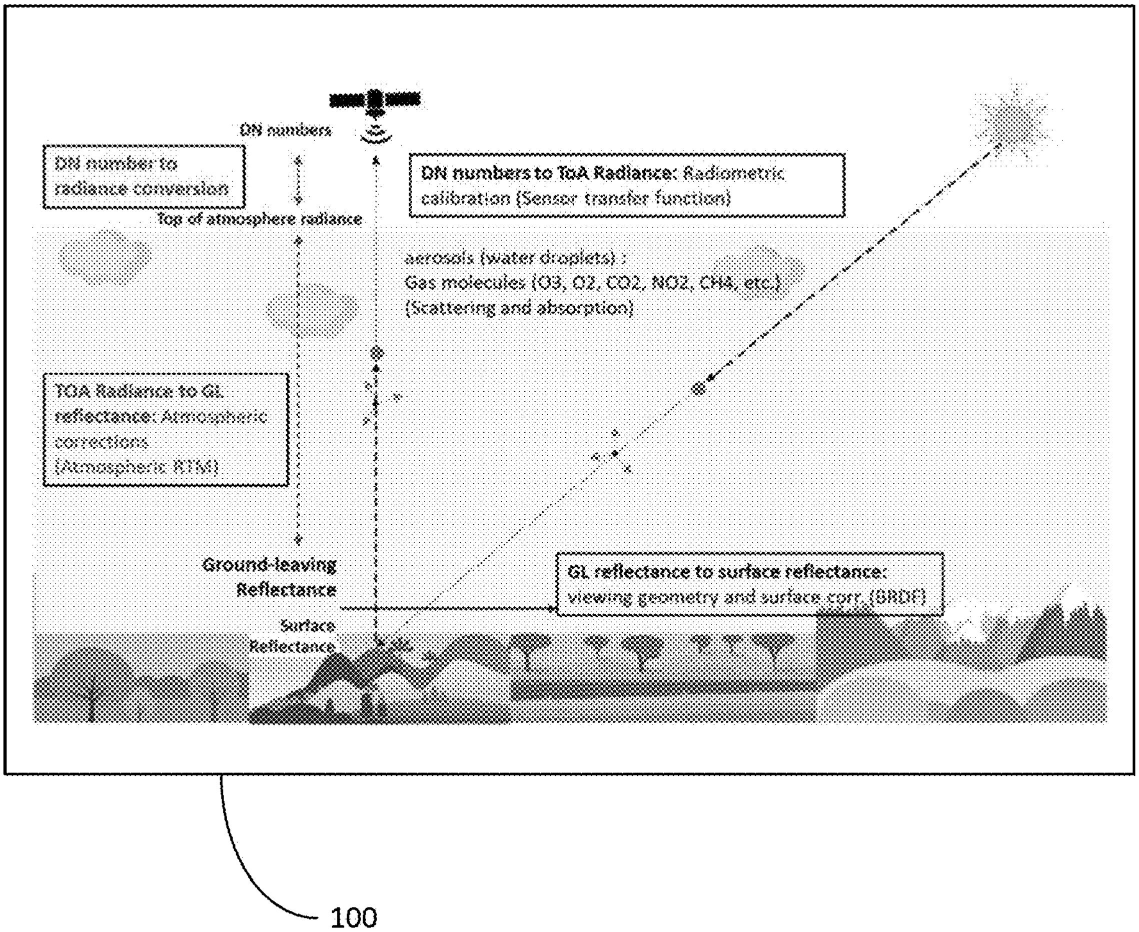
FIG. 1 (background) illustrates an example path of light from sun to sensor 100, according to some embodiments.
Figure 2:
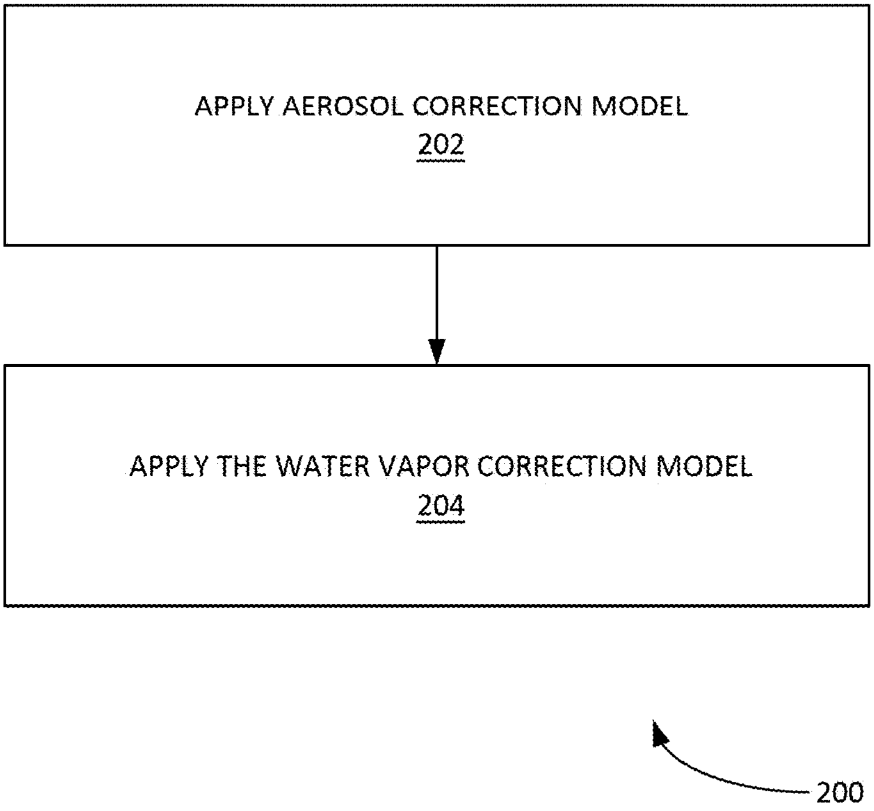
FIG. 2 illustrates an example process for aerosol and water vapor correction for the remotely sensed hyperspectral data, according to some embodiments.

FIG. 2 illustrates an example process for aerosol and water vapor correction for the remotely sensed hyperspectral data, according to some embodiments. Process 200 can use a libRadtran-based atmospheric correction model for aerosol and water vapor correction for the remotely sensed hyperspectral data. Process 200 can apply a pixel-wise albedo estimation for using a correct set of lookup-tables. Process 200 can implement a water absorption strength ratio creation for water vapor correction. More specifically, in step 202, process 200 applies an aerosol correction model. In step 204, process 200 applies a water vapor correction model. Process 200 can be used to generate a model that can be tested on Hyperion and AVIRIS data from various agro-ecological and climatic zones of earth.

Figure 3:
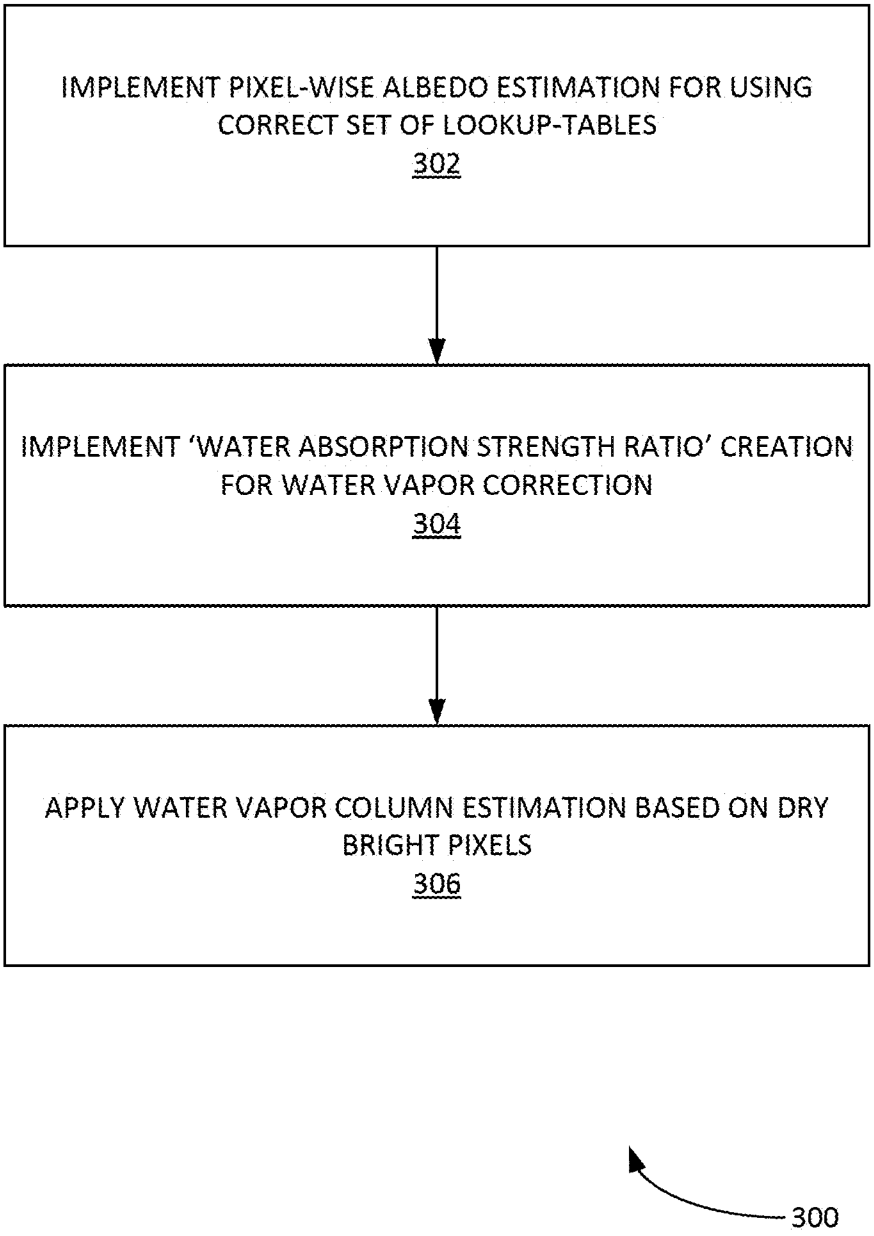
FIG. 3 illustrates a process for implementing a water vapor correction model, according to some embodiments.

FIG. 3 illustrates a process for implementing a water vapor correction model, according to some embodiments. In step 302, process 300 implements pixel-wise albedo estimation for using correct set of lookup-tables. In step 304, process 300 implements 'water absorption strength ratio' creation for water vapor correction. In step 306, process 300 implements water vapor column estimation based on dry bright pixels.

Example pHSICOR Model

Figure 4:
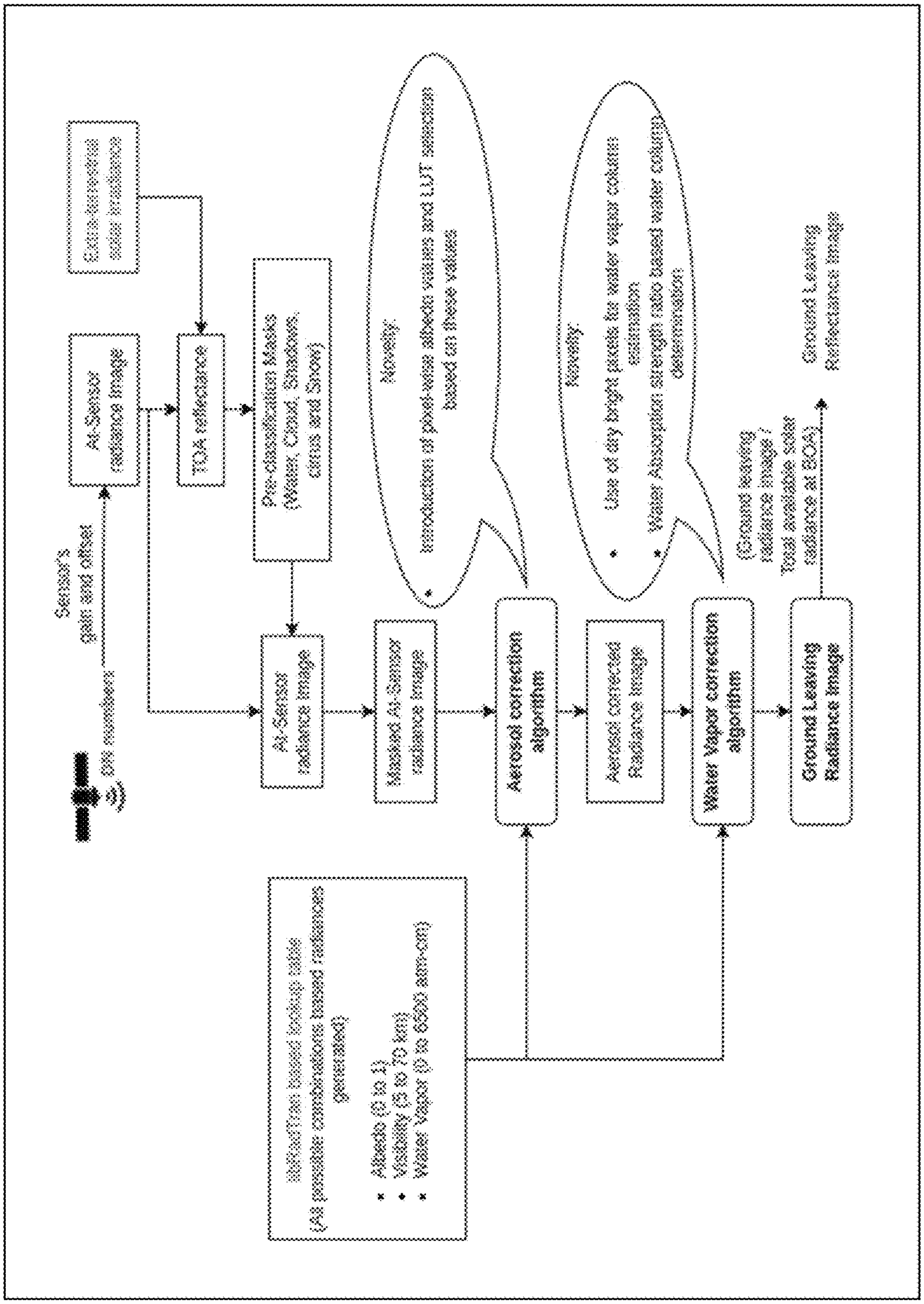
FIG. 4 illustrates an example process of a pHSICOR model, according to some embodiments.

FIG. 4 illustrates an example process 400 of a pHSICOR model, according to some embodiments. Recorded scene at the top of atmosphere (TOA) as a single file raster format along with metadata file containing acquisition date, solar view geometry, gain, bias and bands information and relevant DEM data are given as input for performing atmospheric correction. The pHSICOR model starts with the DN numbers of the satellite image which can be converted to at-sensor radiance using the gain and offset (e.g. provided as metadata with the sensor's satellite image). The at-sensor radiance image is then converted to the top of atmosphere (TOA) reflectance image to create masks (e.g. to identify water, cloud, snow, and shadow pixels in the image) using a pre-classification model. The pre-classification model has been adopted from the ATCOR model pre-classification block. The masked radiance image is then used for aerosol correction. Aerosol correction algorithm uses dark-dense-vegetation (DDV) pixel approach to find visibility (VIS) and libRadtran lookup tables are used for path radiance correction. The aerosol correction majorly affects the radiance spectra in the visible region of the EM spectrum. The water vapor correction algorithm is applied as the last step to further correct the aerosol corrected radiance image at/around the water absorption bands. Wavelengths 1060 and 1120 are used to create water absorption strength ratio (WASR) which are used to obtain a set of dry bright pixels and atmospheric water vapor thickness is calculated for the image. Later, the radiance image is converted to reflectance image. The model is primarily developed and tested for Hyperion LIT dataset and validated against AVIRIS NG data of the same geographical location. It can be extended to other hyperspectral or multispectral datasets if sensor properties and other metadata are available.

Figure 5:
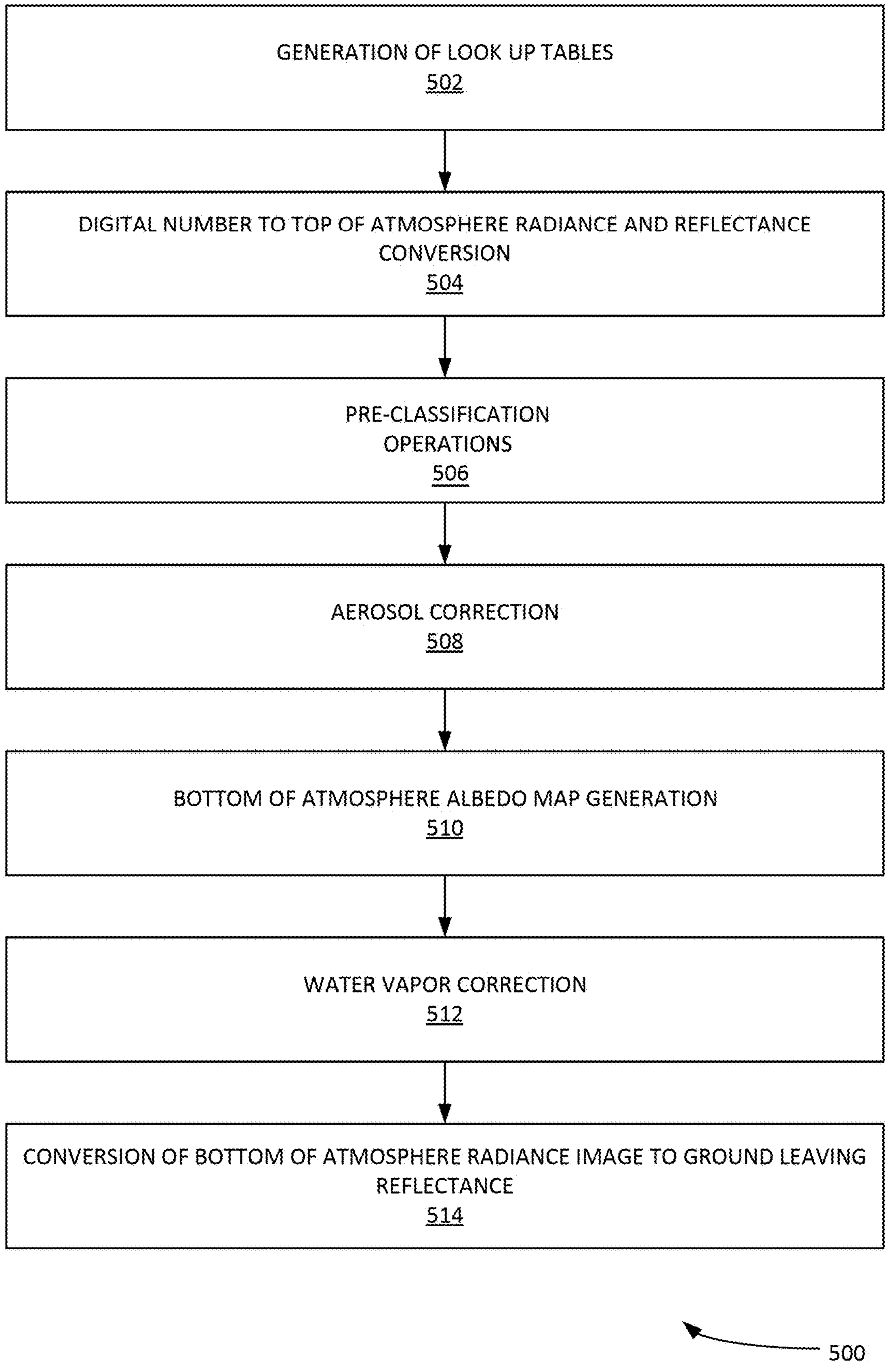
FIG. 5 illustrates another example process of a pHSICOR model, according to some embodiments.

FIG. 5 illustrates another example process 500 of a pHSICOR model, according to some embodiments. In step 502, process 500 can generate lookup tables using libRadtran (e.g. 400 nm to 2500 nm at 1 nm step).

Figure 6:
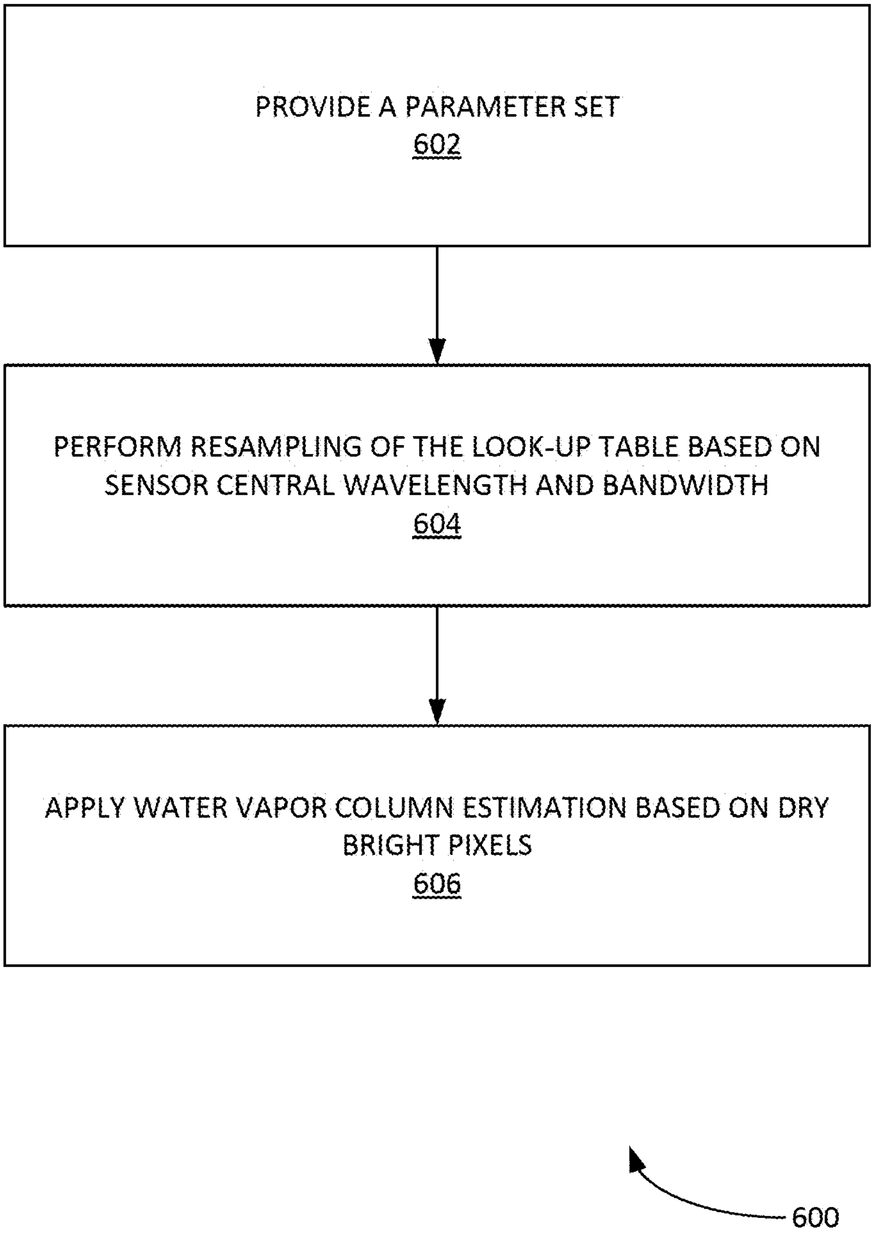
FIG. 6 illustrates an example process for generating lookup tables, according to some embodiments.

FIG. 6 illustrates an example process 600 for generating lookup tables, according to some embodiments. Process 600 can generate lookup tables that were generated using libRadtran software. Queries can be made for each combination of the parameter set. Inputs can be provided for albedo, aerosol type, altitude, visibility, and water vapor values, etc. The libRadtran software can be simulated for flux and radiance values for respective combinations. The outputs of the software were generated in text format, but then processed and converted into an 'hdf5' file format for faster access. The above look up table is generated only once.

Sensor specific wavelength information (central wavelength and bandwidth) are also given as an input to properly resample the look up tables based on sensor properties. Based on the bandwidth of the sensor's central wavelengths, the LUT based data is averaged, and new sensor-specific simulated values are generated. Additionally, path radiance for aerosol and water vapor correction is also calculated and stored in hdf5 file for all the combinations. Sensor specific lookup-table resampling and generation is also a one-time process. Processes discussed herein can use the sensor specific generated lookup-tables for various data corrections.

More specifically, in some embodiments, in step 602, process 600 can provide a parameter set. In one example, this can be as follows.

Albedo: 0 to 1 at 0.05 step;

Aerosol Type: rural, navy, and urban;

Visibility: 5 km to 70 km at 5 km step (further interpolated to 1 km step size);

Water Column: 0 atm-cm to 6500 atm-cm at 250 atm-cm;

Altitudes: 0 km and 100 km; and

Flux/Radiance types: Direct Solar, Upward Diffuse, Downward Diffuse and

Radiance.

In step 604, process 600 can perform resampling of the lookup table based on sensor central wavelength and bandwidth. In step 606, process 600 can implement path radiance extraction. This step can obtain, inter alia: Aerosol Path Radiance, Water Vapor Column Path Radiance, etc.

Returning to process 500, in step 504, process 500 can implement conversion of Digital Number to Top of Atmosphere Radiance and Reflectance.

Figure 7:
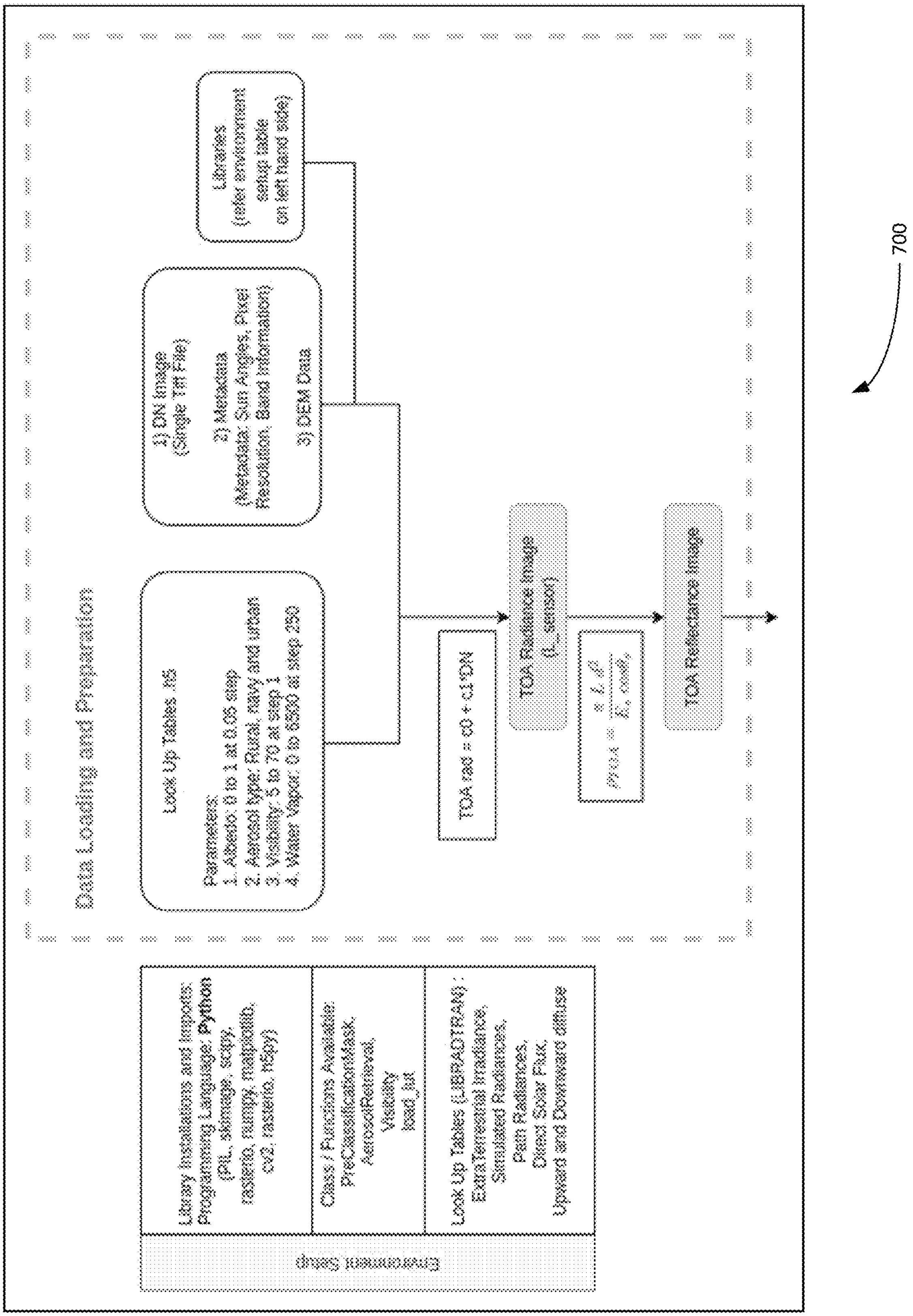
FIG. 7 illustrates an example process flow digital number to top of atmosphere radiance and reflectance conversion, according to some embodiments.

FIG. 7 illustrates an example process flow 700 digital number to top of atmosphere radiance and reflectance conversion, according to some embodiments. The spatially ortho-corrected and georeferenced hyperspectral satellite image having pixel values as DN numbers can be prepared into a single raster file (e.g. as a GeoTIFF image). For example, a Hyperion dataset comes with each band as a separate raster file. Initial preparation is done to remove noisy bands, which are below 420 nm and above 2400 nm for Hyperion datasets. The remaining bands are combined into a single file. Libraries (e.g. Rasterio, NumPy, hdf5, etc.) can be used for data handling throughout the correction process.

A raster file path can be given as an input from where the libraries can read the image. The inputs can be provided to the model through a JSON format file. A digital elevation map for the recorded scene is taken from SRTM-1 arc-second global dataset and mapped to the input raster to match spatial resolution and geo-location. A bounding box of the raster image along with CRS (Coordinate Reference Systems) system reprojection techniques are used to properly align DEM data onto the raster image to mask and resize the DEM data for providing it as an input to the pHSICOR model. DEM data is used in estimation of the bottom of atmospheric albedo which in turn is used for water vapor column estimation and water vapor correction.

The model uses gain ($c_1$) and bias ($c_0$) to convert digital numbers (DN) to radiance. Equation 1 infra shows the formula used to convert DN numbers to radiance using gain and bias values. If the data is available in radiance format itself, then the conversion step may not be required.

$$L = c_0 + c_1 * DN \qquad \text{Equation 1}$$

The model then uses date of acquisition of the recorded scene, to calculate earth sun distance (d), extraterrestrial solar irradiance ($E_s$) and solar zenith angle ($\theta_z$) to convert TOA radiance image (L) to TOA reflectance image using Equation 2 infra. The flowchart for conversion of digital number to top of atmosphere radiance and reflectance conversion is shown in FIG. 7.

$$\rho_{TOA} = \frac{\pi L d^2}{E_s \cos\theta_z} \qquad \text{Equation 2}$$

Returning to process 500, in step 506, process 500 implement pre-classification operations. In step 506, the TOA reflectance image is used to generate masks for water, cloud, snow, and shadow pixels through manual thresholding on different band and index reflectance values. These pixels can be masked for estimation of visibility and water vapor values and as the atmospheric correction is not applied on them. Thresholds applied on different bands are shown in FIG. 8, according to some embodiments.

In step 508, process 500 implements aerosol correction. FIG. 9 illustrates an example Aerosol correction flowchart 900, according to some embodiments. FIG. 10 illustrates an example process 1000 for aerosol correction, according to some embodiments. In step 1002, process 100 implements DDV pixel selection. In step 1004, process 100 performs aerosol type estimation. In step 1006, process 100 implements visibility map generation. In step 1008, process 100 implements radiance updation. Processes 900 and 1000 can be used together to implement step 508.

DDV pixels are selected based on reflectance at 2200 nm wavelength. Wavelength 2200 nm is least affected by aerosol particles. Thus, a thresholding model on 2200 nm band along with higher NDVI value criteria is applied to select dark dense vegetation pixels that are not masked in the pre-classification step. A pre-classification mask along with a buffer mask of 500 m from cloud and water pixels can be applied to mask the image for selecting DDV pixels to ensure no interference from the pre-classification classes. In case 2200 nm wavelength is not available, thresholding is applied on 1600 nm. The thresholds are iteratively selected to ensure that DDV pixels can be between 2% to 10% of the pixels in the image.

In the pHSICOR model, three aerosol types can be selected—Rural, Urban, and Navy. Aerosol type can be fed into the model in two ways. (i) as a user input, and (ii) can be estimated using mean path radiance ratio. If the hyperspectral image is from a known area, then the user will have the option to select the aerosol type manually. Otherwise, the mean path radiance ratio can be calculated for DDV pixels as a ratio between blue and red bands (e.g. 480 nm and 660 nm, respectively). Simulated path radiance ratios for the three aerosol types are pre-generated from libRadtran for 0 albedo and 23 km visibility condition. The simulated path radiance ratios are 2.1, 2.0 and 1.9, for rural, urban, and navy aerosol types respectively. Now, the DDV pixel mean path radiance ratio can be compared against simulated values to find the nearest matching aerosol type. Aerosol type is an important parameter to determine the behavior of the path radiance across wavelengths.

Visibility values can then be estimated for DDV pixels at 0 albedo and 0 atm-cm water vapor column. The measured at-sensor radiance at 550 nm is compared with the simulated radiance curve to assign the nearest visibility value to each of the DDV pixels. Spatial interpolation and mean imputation are performed to assign visibility values to non DDV pixels. To avoid abrupt changes of visibility in the neighborhood pixels, gaussian smoothing is performed on the visibility map. If DDV pixels are not available for an image, a mean visibility of 11 km can be applied to all the pixels.

Aerosol path radiance is extracted from the Lookup table for each pixel at obtained visibility, 0 albedo and 0 water vapor column values. The formula for aerosol path radiance is shown in Equation 3. Aerosol path radiance is then subtracted from image TOA radiance to calculate aerosol corrected radiance image as shown in Equation 4.

$$\text{Aerosol Path Radiance} = \left(\Delta flux * \frac{\text{radiance at 100 km}}{\text{Direct Solar Flux at 100 km}}\right) \quad \text{Equation 3}$$

Where, $$\Delta flux = [(\text{Direct Solar at 100 km} - \text{Direct Solar at 0 km}) + (\text{Upward Diffuse at 100 km} - \text{Upward Diffuse at 0 km}) + (\text{Downward Diffuse at 100 km} - \text{Downward Diffuse at 0 km})], \quad \text{Equation 4}$$

at obtained visibility, 0 albedo and 0 water vapor $$\text{Aerosol corrected radiance} = \text{Image TOA radiance} - \text{Aerosol path radiance}$$

Returning to process 500, in step 510, process 500 implements bottom of atmosphere albedo map generation. Process 500 can make use of the bottom of atmosphere albedo map for atmospheric correction. The TOA direct solar flux values from libRadtran look-up-table are used as weights to perform weighted summation of TOA reflectance image across bands as shown in Equation 5, and Equation 6. The bottom of atmosphere albedo map is then generated using TOA albedo, path radiance, and atmospheric transmissivity τ as shown in Equation 7, and Equation 8.

$$A_{TOA} = \sum_{i=1}^{bands} (w_i * \rho_{TOA,i}) \quad \text{Equation 5}$$

$$w_i = \frac{\text{Direct Solar at } i^{th} \text{ wavelength}}{\sum(\text{Direct Solar across all wavelengths})} \quad \text{Equation 6}$$

$$A_{BOA} = \frac{A_{BOA} - \text{p\_rad}}{\tau^2} \quad \text{Equation 7}$$

$$\tau = 0.75 + (\text{h\_dem}) * 2 * 10^{-5} \quad \text{Equation 8}$$

Here, $A_{TOA}$ is albedo at top of atmosphere; $w_i$ is weight as calculated by equation 4; $\rho_{TOA,i}$ is reflectance value of a pixel for $i^{th}$ band at top of atmosphere; $A_{BOA}$ is albedo at bottom of atmosphere, p_rad is average back-scattered reflectance by the atmosphere before it reaches earth's surface, τ is atmospheric transmissivity and h_dem is the elevation above sea level in meters at a pixel. p_rad is taken as 0.03. τ is calculated assuming clear sky and relatively dry conditions and using an elevation-transmissivity relationship from FAO-56. BOA albedo map can be used to extract path radiance for Water Vapor Correction from the Lookup Table.

Returning to process 500, in step 512, process 500 implements water vapor correction. It is noted that water molecules present in the atmosphere primarily impact water absorption bands of the EM spectrum. These water absorption bands can be centered around 950, 1200, 1450, 1950 and 2500 nm. Process 500 can correct the effect of water absorption in spectra up to 1200 nm.

FIG. 12 illustrates an example process 1200 for implementing water vapor correction, according to some embodiments. In step 1202, dry bright pixels (DBP) can be selected from the image under consideration. To select DBP, water absorption strength ratio (WASR) is generated using equation 9 or 10, as per data availability in step 1204.

$$WASR = \frac{\text{Reflectance at 1060} - \text{Reflectance at 1120}}{\text{Reflectance at 1060} + \text{Reflectance at 1120}} \quad \text{Equation 9}$$

$$WASR = \frac{\text{Reflectance at 890} - \text{Reflectance at 940}}{\text{Reflectance at 890} + \text{Reflectance at 940}} \quad \text{Equation 10}$$

Pixels having NDVI<0.4 in the image tile can be considered for selection of DBP. The pixels having WASR values less than 1 percentile are selected as dry bright pixels in step 1206. In step 1208, pre-classification map is used to mask the image before selecting dry bright pixels to ensure negligible interference from the pre-classification classes. The values of WASR for DBPs can be compared against LibRadTran-based simulated WASR in step 1210. The simulation was done with obtained albedo and obtained visibility values for respective DBPs. WASR is then calculated from the simulated radiance for all possible water vapor values, and the closest WASR value (closest to WASR values of image DBPs) is used to determine water vapor column for DBP in step 1212. Water vapor column is estimated for DBPs and the average water vapor column is assigned to all the pixels in the scene in step 1214.

Water vapor path radiance can be calculated from the lookup table for each pixel by filtering the values with obtained water vapor column, obtained albedo values, and constant visibility of 5 km (minimum available visibility). The formula for calculating water vapor path radiance is shown in Equation 11. Water vapor path radiance is then subtracted from aerosol corrected radiance image to calculate water vapor corrected radiance image. The formula for calculating final atmospheric corrected radiance is as shown in Equation 12.

$$\text{Water vapor path radiance} = (TOA \text{ radiance at obtained water vapor} - TOA \text{ radiance at 0 atm cm water vapor}) \quad \text{Equation 11}$$

at obtained albedo and obtained visibility;

$$\text{Atmospheric corrected radiance} = (\text{Aerosol corrected radiance} - \text{Water vapor path radiance}) \quad \text{Equation 12}$$

FIG. 11 shows the flowchart 1100 of an atmospheric water vapor correction algorithm, according to some embodiments.

Returning to process 500, in step 514, process 500 can implement conversion of bottom of atmosphere radiance image to ground leaving reflectance. FIG. 13 illustrates an example process 1300 for converting a bottom of atmosphere radiance image to ground leaving reflectance, according to some embodiments. In step 1302, to convert the pHSICOR corrected BOA radiance into ground leaving reflectance, it is divided by total available solar radiance at the BOA (e.g. as shown in Equation 13). The total available solar radiance is obtained for each pixel by filtering the look-up-table with obtained visibility value, 0 atm-cm water vapor column and 0.55 albedo in step 1304.

$$\text{Atmospheric corrected reflectance} = \frac{pHSICOR\ \text{corrected radiance}}{\text{total available solar radiance at the } BOA} \quad \text{Equation 13}$$

The Savitzky-Golay algorithm based high frequency noise smoothing is applied on the ground leaving reflectance (GLR) images, along with removal of uncorrected water absorption bands, between 1310 nm to 1510 nm, 1740 nm to 2020 nm and above 2300 nm, to obtain spectral smoothened ground leaving reflectance (SGLR) in step 1306. The SGLR image is the final output of the pHSICOR model. SGLR images are scaled between 0-255 to convert the data type to unsigned 8-bit integers for minimum memory consumption in step 1308.

The following are the list of outputs that can be accessed from the model, inter alia: top of atmosphere radiance and reflectance images, pre-classification map, dark dense vegetation map, visibility map, dry bright pixel map, water vapor column map, bottom of atmosphere albedo map, aerosol corrected radiance image, atmospheric corrected radiance, and atmospheric corrected reflectance images.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computer-implemented method of correcting a hyperspectral satellite image, the method comprising:

receiving, by one or more processors, an at-sensor digital number (DN) image generated by a hyperspectral satellite;

generating, by the one or more processors using a radiative transfer model, one or more lookup tables configured to convert the at-sensor DN image to atmospheric-corrected image products;

converting, by the one or more processors, the at-sensor DN image to a top-of-atmosphere (TOA) radiance image;

converting, by the one or more processors, the TOA radiance image to a TOA reflectance image;

generating, by the one or more processors from the TOA reflectance image, a pre-classification mask identifying pixels for atmospheric correction;

applying, by the one or more processors, the pre-classification mask to the TOA radiance image to generate a masked TOA radiance image;

performing, by the one or more processors, an aerosol correction on the masked TOA radiance image by generating a pixel-wise albedo estimate and applying the one or more lookup tables based on the pixel-wise albedo estimate to generate an aerosol-corrected radiance image;

performing, by the one or more processors, a water-vapor correction on the aerosol-corrected radiance image to generate a bottom-of-atmosphere (BOA) radiance image; and converting, by the one or more processors, the BOA radiance image to a BOA reflectance image.

* * * * *